US008765644B2

(12) United States Patent
Yu et al.

(10) Patent No.: US 8,765,644 B2
(45) Date of Patent: Jul. 1, 2014

(54) POLYAMIDE EMULSIFIER BASED ON POLYAMINES AND FATTY ACID/CARBOXYLIC ACID FOR OIL BASED DRILLING FLUID APPLICATIONS

(75) Inventors: Hua Yu, Scarsdale, NY (US); Dale Stanley Steichen, Danbury, CT (US); Alan Duncan James, Hopewell Junction, NY (US); Jon B. Staley, Rolling Meadows, IL (US); Thomas William Himmel, Naperville, IL (US)

(73) Assignee: Akzo Nobel N.V., Arnhem (NL)

( * ) Notice: Subject to any disclaimer, the term of this patent is extended or adjusted under 35 U.S.C. 154(b) by 253 days.

(21) Appl. No.: 12/992,463

(22) PCT Filed: May 12, 2009

(86) PCT No.: PCT/EP2009/055684

§ 371 (c)(1), (2), (4) Date: Jan. 6, 2011

(87) PCT Pub. No.: WO2009/138383

PCT Pub. Date: Nov. 19, 2009

(65) Prior Publication Data

US 2011/0306523 A1 Dec. 15, 2011

Related U.S. Application Data

(60) Provisional application No. 61/053,493, filed on May 15, 2008.

(30) Foreign Application Priority Data

Jun. 26, 2008 (EP) .................................... 08159130

(51) Int. Cl.
*C09K 8/34* (2006.01)
*C07C 231/02* (2006.01)
*C07C 231/10* (2006.01)

(52) U.S. Cl.
USPC ........... 507/131; 507/129; 507/137; 507/139; 554/37

(58) Field of Classification Search
USPC .......... 507/131, 103, 904; 516/9, 915; 554/37
See application file for complete search history.

(56) References Cited

U.S. PATENT DOCUMENTS

| | | | | |
|---|---|---|---|---|
| 3,166,548 | A | 1/1965 | Kirkpatrick et al. | |
| 3,169,113 | A | 2/1965 | Kirkpatrick et al. | |
| 4,501,672 | A | 2/1985 | Connell et al. | |
| 4,508,628 | A | 4/1985 | Walker et al. | |
| 4,575,428 | A | 3/1986 | Clapper et al. | |
| 4,658,036 | A | 4/1987 | Schilling | |
| 7,247,604 | B2 | 7/2007 | Dalmazzone et al. | |
| 2007/0093393 | A1 * | 4/2007 | Navarrete et al. | 507/131 |

FOREIGN PATENT DOCUMENTS

| | | |
|---|---|---|
| GB | 2 158 437 A | 11/1985 |
| WO | WO 89/11516 | 11/1989 |

OTHER PUBLICATIONS

European Search Report for EP Application No. 08159130.7; Dec. 8, 2008.
International Search Report for PCT Application No. PCT/EP2009/055684; Sep. 2, 2009.
"Berolamine 20 Safety Data Sheet," Akzo Nobel Product Information(Online), (Oct. 7, 2006), pp. 1-7, XP002507098 http://www.ethyleneamines.com/NR/rdon10/BA20_sds_2006.pdf.

* cited by examiner

*Primary Examiner* — John J Figueroa
(74) *Attorney, Agent, or Firm* — Norris McLaughlin & Marcus PA

(57) ABSTRACT

The present invention generally relates to emulsifiers for oil-based drilling fluids and muds comprising an emulsifier based on the polyamides derived from fatty acid/carboxylic acid and optionally alkoxylated polyamines. The invention also relates to oil or synthetic based drilling fluids comprising the emulsifiers of the invention and to drilling methods utilizing same.

13 Claims, 2 Drawing Sheets

POLYAMIDE EMULSIFIER BASED ON POLYAMINES AND FATTY ACID/CARBOXYLIC ACID FOR OIL BASED DRILLING FLUID APPLICATIONS

The present case is based on International patent application No. PCT/EP2009/055684 filed May 5, 2009 and claims priority of European patent application No. 08159130.7 filed on Jun. 26, 2008 and U.S. patent application No. 61/053,493 filed May 15, 2008.

FIELD OF THE INVENTION

The present invention generally relates to emulsifiers for oil-based drilling fluids and muds based on the polyamides derived from fatty acid/carboxylic acid and polyamines. The invention also relates to oil or synthetic based drilling fluids comprising the emulsifiers of the invention and to drilling methods utilizing same.

BACKGROUND OF THE INVENTION

A drilling fluid or mud is a specially designed fluid that is circulated through a wellbore as the wellbore is being drilled to facilitate the drilling operation. Drilling fluids facilitate the removal of drill cuttings from the wellbore, cool and lubricate the drill bit, aid in supporting the drill pipe and drill bit, and provide a hydrostatic head to maintain the integrity of the wellbore walls thereby minimizing the potential for well blowouts. Specific drilling fluid systems are selected to optimize a drilling operation in accordance with the characteristics of a particular geological formation.

Oil or synthetic-based mud, or invert emulsions, are normally used to drill swelling or sloughing shale, salt, gypsum, anhydrite or other evaporate formations, hydrogen sulfide-containing formations, and hot (greater than about 300° F.) holes, but may be used in other holes penetrating a subterranean formation as well. This class of drilling fluids typically contains oil or a synthetic oil or other synthetic material or synthetic fluid ("synthetic") as the continuous phase and may also contain water which is dispersed in the continuous phase by emulsification so that there is no distinct layer of water in the fluid. The term "oil mud" or "oil or synthetic-based mud" typically means an invert oil mud emulsion or invert emulsion. An all oil mud simply comprises 100% oil by volume as the liquid phase; that is, there is no aqueous internal phase. An invert emulsion drilling fluid may commonly comprise between about 50:50 to 95:5 by volume oil phase to water phase.

Invert emulsions used in drilling typically comprise: a base oil or synthetic fluid for the external phase; a saline, aqueous solution for the internal phase (typically a solution comprising about 30% calcium chloride); and other agents or additives for suspension, fluid loss, density, oil-wetting, emulsification, filtration, and rheology control.

U.S. Pat. No. 7,247,604 generally relates to alkanolamide based emulsifiers obtained by transamidification of fatty acid esters and mono-alcohols or oils of a plant of animal origin (triglyceride) with alkanoamine. The oil based drilling fluid made with the emulsifier and co-surfactant was claimed having temperature-stable, non-toxic to the environment, and high temperature and high pressure (HTHP) well drilling, completion or workover application properties.

U.S. Pat. Nos. 4,508,628 and 4,575,428 disclose invert emulsion drilling fluid emulsfiers derived from polyamines. The preferred polyamide emulsifiers are prepared by first reacting a polyamine with fatty acid in order to form a amidoamine and thereafter reacting the amidoamine intermediate with a dicarboxylic acid (in U.S. Pat. No. 4,508,628) or tricarboxylic acid (in U.S. Pat. No. 4,575,428). It is apparent from the disclosure of the documents that short chain polyamines containing no alkoxy groups are contemplated.

U.S. Pat. No. 3,169,113 discloses emulsifiers for water-in-oil acidic fracturing fluids. The disclosed emulsifier has two components: (a) a 9-18 carbon monocarboxylic acid fatty acid salt of a partial amide of a polyalkyllene polyamine with 2-6 carbon alkylene groups and 3-5 amino nitrogens in which at least two amino groups are amidified with 9-18 carbon monocarboxylic fatty acids and wherein there is at least one nonamidified amino group forming a salt with the acid and, (b) a polyamide of an alkylene polyamine with 2-6 carbon alkylene groups and 2-5 amino nitrogens and a 9-18 carbon monocarboxylic fatty acid.

U.S. Pat. No. 4,501,672 discloses fluid loss reducing additives for oil-based working fluids. The additive is obtained by reacting 1 mole of dialkylene triamine with 2 moles of fatty acid. Example 1 specifically covers the bridging of diethylenetriamine dioleylamide with maleic anhydride.

WO 89/11516 discloses oil-based emulsifiers for drilling fluids that are the reaction product of one or two moles of an amide-amine or a hydroxylalkylamide with one to five moles of a dicarboxylic acid or an acid anhydride. Starting on page 5 of this document it is apparent that the use of short chain polyamines with no alkoxy groups is contemplated.

U.S. Pat. No. 4,658,036 discloses an invert emulsion and a process of preparing same. The emulsifiers are prepared by reacting at least one tall oil fatty acid with acrylic acid, maleic anhydride, or fumaric acid, followed by reaction with diethylenetriamine and at least one tall oil fatty acid in order to give the invert emulsifier.

With space at some well sites limited, such as on offshore platforms, and with increasing costs of transport of materials to a well site, there is industry-wide interest, on-going need for more efficient and concentrated drilling fluid additives and for drilling fluids which can be formulated and maintained with fewer additives in lesser amounts than commonly utilized with prior art drilling fluids.

SUMMARY OF THE INVENTION

One object of the present invention is thus to provide a drilling fluid additive that can at least partly meet the above mentioned need in the art.

The present inventors have surprisingly found that certain polyamides which are derived from fatty acid/carboxylic acid and optionally alkoxylated polyamides are very efficient as emulsifiers for oil-based drilling fluids and muds.

Hence, in a first aspect, the present invention relates to a polyamide compound according to the appended claims.

Conventional emulsifiers for oil-based mud will usually degrade under high-temperature and pressure conditions, which leads to the deterioration of the oil-based mud. This requires that more emulsifier be put into the mud system in order to maintain the desired properties, which can substantially increase the cost of the system. The emulsifier of the present invention is much more effective under high temperature and high pressure conditions thus reducing the amount of additional emulsifier required to emulsify the system, thereby improving the performance and cost of the system.

In a third aspect, the present invention relates to a drilling fluid composition comprising an oil and at least one such polyamide compound.

In a third aspect, the present invention relates to a process for the manufacture of such polyamide compounds.

In a fourth aspect, the present invention relates to the use of such polyamide compounds as emulsifiers for oil based drilling fluids.

These and other aspects of the present invention will be further described in the following detailed description of the invention.

DETAILED DESCRIPTION OF THE INVENTION

The polyamides of the invention are derived from fatty acid/carboxylic acid and optionally alkoxylated polyamines. They provide emulsification and allow concentrated products, either solids or liquids, with superior properties. Conventional emulsifiers for oil-based mud will usually degrade under high-temperature and pressure conditions, which leads to the deterioration of the oil-based mud. This requires that more emulsifier be put into the mud system in order to maintain the desired properties, which can substantially increase the cost of the system. The emulsifier of the present invention is much more effective under high temperature and high pressure conditions thus reducing the amount of additional emulsifier required to emulsify the system, thereby improving the performance and cost of the system.

The polyamide emulsifiers of the invention can generally be represented by formula (A)

$$Y\{O(CH_2)_e\}_a\{NX(CH_2)_e\}_b\{N[C(O)R^2](CH_2)_e\}_c\{NH(CH_2)_e\}_dNHZ \quad (A)$$

wherein a is an integer of from 0-5, in another embodiment 0 to 2, b and c are each independently selected from integers of from 0 to 10, with the proviso that b and c cannot both be 0 at the same time, d is from 0 to 10, e is an integer of from 1-5, Y is selected from H, X, $C(O)R^1$ or $C(O)R^2$ and Z is selected from $C(O)R^1$ or X, where $R^1$ and $R^2$ are linear or branched, saturated or unsaturated alkylene groups, and X is a carbonyl group derived from a monocarboxylic acid, dicarboxylic acid, or tricarboxylic acid containing a $C_2$ to $C_{10}$ hydrocarbon group, such as a alkyl and/or alkylene, or a mixture of such acids. One of ordinary skill in the art would recognize that various polycarboxylic acids could be utilized including, but not limited to formic acid, acrylic acid, amino acid, malic acid (anhydrate), succinic acid, glutaric acid, adipic acid, lactic acid, citric acid and the like, and mixtures thereof.

In embodiments of the invention, a is typically an integer from 0 to 5, such as from 0 to 2, for example 0 to 1, such as 1.

Each of b and c are typically independently selected from an integer of from 0 to 10, such as 0 to 4, such as 0 to 3, with the proviso that b and c cannot both be 0 at the same time.

Typically, d is from 0 to 10, such as from 0 to 4.

In each instance, e is typically independently from 1 to 5, such as from 2 to 4.

$R^1$ and $R^2$ are same or different and are selected from linear or branched, saturated or unsaturated $C_7$ to $C_{30}$, such as $C_{10}$ to $C_{24}$, such as $C_{16}$ to $C_{22}$, hydrocarbyl groups, such as alkyl or alkenyl groups. Typically $R^1$ and $R^2$ each is a linear alkyl or mono- or polyunsaturated linear alkenyl.

In one embodiment, a is 0 to 1, each of b and c are independently selected from an integer of from 0 to 3, with the proviso that b and c cannot both be 0 at the same time, d is selected from 0 to 2, e is from 2 to 4, and $R^1$ and $R^2$ are each independently selected from linear or branched, saturated or unsaturated $C_{16}$-$C_{22}$ hydrocarbyl groups.

$R^1$ and $R^2$ are typically derived from a fatty acid source. Fatty acids typically has the general formula R—COOH, where R, which represents $R^1$ and/or $R^2$ in formula A. Typically, R is a saturated (alkyl) or mono or polyunsaturated (alkenyl) $C_7$ to $C_{30}$ hydrocarbon. Fatty acid sources include, but are not limited to coconut, mustard seed, palm, palm kernal, soybean, tallow, tall oil, rape seed, safflower, sunflower and mixtures thereof. Fatty acid sources, such as vegetabilic and animalic sources typically each provide a mixture of fatty acids of different lengths. In embodiments of the invention, the fatty acid source is selected from tall oil, rape seed, mustard seed and mixtures thereof.

Fatty acids R—COOH from which $R^1$ and $R^2$ are derived from include, but are not limited to caprylic, decanoic, lauric, myristic, palmitic, heptadecanoic, stearic, arachidic, behenic, lignoceric, linolenic, stearidonic, eicosapentaenoic, docosahexaenoic, arachidonic, oleic, elaidic, erucic and nervonic acids.

Tall oil or rape seed fatty acids are particularly preferred fatty acid sources for use in the process for making the polyamide emulsifier of the present invention.

Fatty acids from tall oil includes, but are not limited to palmitic acid, oleic acid and linoleic acid, while fatty acids from rape seed oil includes, but are not limited to, erucic acid.

In another embodiment, the polyamide emulsifier of the invention is represented by the formula:

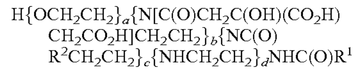

where $R^1$ and $R^2$ are each independently selected from linear or branched, saturated or unsaturated hydrocarbyl groups. In another embodiment, $R^1$ and $R^2$ are each independently selected from linear or branched, saturated or unsaturated $C_{10}$-$C_{24}$ hydrocarbyl groups. As mentioned above, $R^1$ and $R^2$ can be derived from a fatty acid source such as tall oil, rape seeds, mustard seeds and/or mixtures thereof and the like. In this embodiment, X substituent of general formula (A) is a carbonyl group derived from citric acid, as is apparent from the above formula.

In another embodiment, the polyamide emulsifier of the invention is chosen from at one or more polyamides of the following formulae:

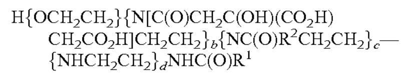

wherein $R^1$=$R^2$=$C_{17}$ hydrocarbyl group derived from from tall acid; and b is 0 to 4, c is 0 to 4, with the proviso that b and c cannot both be 0 at the same time, and d is 0 to 4, and in another embodiment, b is 0 to 3, c is 0 to 3, with the proviso that b and c cannot both be 0 at the same time, with the proviso that b and c cannot both be 0 at the same time, and d is 0 to 2;

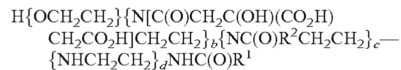

wherein $R^1$=$R^2$=$C_{21}$ hydrocarbyl group derived from erucic acid; and b is 0 to 4, c is 0 to 4, with the proviso that b and c cannot both be 0 at the same time, and d is 0 to 4, and in another embodiment, b is 0 to 3, c is 0 to 3, with the proviso that b and c cannot both be 0 at the same time, and d is 0 to 2;

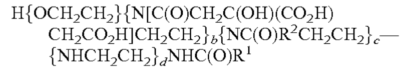

wherein $R^1$=$R^2$=$C_{17}$ hydrocarbyl group derived from oleic acid; and b is 0 to 4, c is 0 to 4, with the proviso that b and c cannot both be 0 at the same time, and d is 0 to 4, and in another embodiment, b is 0 to 3, c is 0 to 3, with the proviso that b and c cannot both be 0 at the same time, and d is 0 to 2;

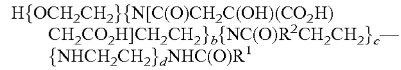

wherein $R^1=R^2=C_{17}$ hydrocarbyl group derived from soybean oil, such as the hydrocarbyl derived from α-linolenic acid; and b is 0 to 4, c is 0 to 4, with the proviso that b and c cannot both be 0 at the same time, and d is 0 to 4, and in another embodiment, b is 0 to 3, c is 0 to 3, with the proviso that b and c cannot both be 0 at the same time, and d is 0 to 2;

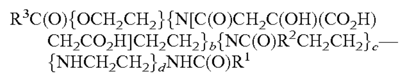

wherein $R^1=R^2=R^3=C_{17}$ hydrocarbyl group derived from tall oil, such as the hydrocarbyl derived from oleic acid and/or linoleic acid; and b is 0 to 4, c is 0 to 4, with the proviso that b and c cannot both be 0 at the same time, and d is 0 to 4, and in another embodiment, b is 0 to 3, c is 0 to 3, with the proviso that b and c cannot both be 0 at the same time, and d is 0 to 2; and $$R^3C(O)\{OCH_2CH_2\}\{N[C(O)CH_2C(OH)(CO_2H)CH_2CO_2H]CH_2CH_2\}_b\{NC(O)R^2CH_2CH_2\}_c\text{—}\{NHCH_2CH_2\}_dNHC(O)R^1$$

wherein $R^1=R^2=R^3=C_{17}$ hydrocarbyl group derived from erucic acid; and b is 0 to 4, c is 0 to 4, with the proviso that b and c cannot both be 0 at the same time, and d is 0 to 4, and in another embodiment, b is 0 to 3, c is 0 to 3, but b and c can't be 0 at the same time, and d is 0 to 2.

The emulsifier of the invention is highly effective with low dosage use, and when used in a typical oil-based drilling fluid formulation, produces a drilling fluid with high electric stability and excellent rheology before and after aging. Additionally, there is no need to add lime to the mud system in order to activate the emulsifier of the invention, i.e., the emulsifier of the invention can be utilized without the use of lime. In one embodiment, the emulsifier of the invention is lime free. The emulsifier of the invention also has low fluid loss (filtration properties) at high temperature and pressure using relatively low dosages, without the necessity of utilizing other fluid loss or filtration additives.

The polyamide emulsifier of the invention is generally prepared from the condensation reaction between fatty acids (I) and optionally alkoxylated polyamines (II). The fatty acids and optionally alkoxylated polyamines are reacted in such proportion as to create an optionally alkoxylated amidoamine intermediate product (III) having 1 equivalent of primary plus secondary amines (N—H bonds) in optionally alkoxylated polyamine (II) reacts with 0.2 to 2.0 equivalents of carboxylic acid in fatty acid (I). The preferred ratio is 0.3 to 1.5 eq of carboxylic acids, and the most preferred is 0.4 to 1 eq. Then, 1 eq of N—H bonds in optionally alkoxylated amidoamine intermediate (III) is further reacted with 0.01 to 2.0 eq of carboxylic acids in a monocarboxylic acid, dicarboxylic acid, or tricarboxylic acid containing $C_2$ to $C_{10}$ alkyl/alkylene groups, or a mixture of such acids at 0.01 to 2.0 eq of carboxylic acids, in another embodiment from about 0.2 to 1.5 eq of carboxylic acids in order to get the optionally alkoxylated polyamide emulsifier of the present invention (V). By optionally alkoxylated polyamine/polyamide etc is meant a polyamine/polyamide etc that may or may not be alkoxylated. With references to formula A above, the polyamide compound is alkoxylated if a is other than 0. Citric acid (IV) is exemplified in the reaction below.

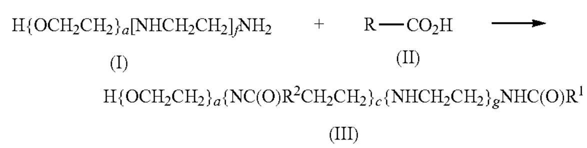

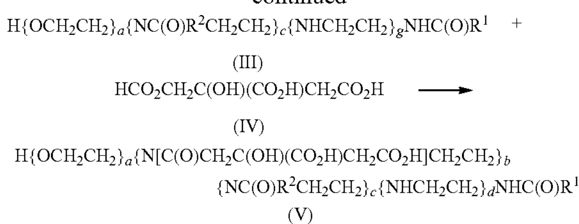

The fatty acids (II) employable in the preparative reaction are generally selected from fatty acids of the formula: R—C(O)OH wherein R is a saturated or unsaturated, branched or straight chain, substituted or unsubstituted hydrocarbyl group having from 7 to 30 carbon atoms.

The polyamines employable in the aforementioned process include, but are not limited to those represented by the formula:

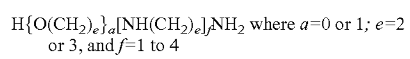

Alkoxylated polyamines, alkoxylated fatty polyamine, alkoxylated diamines, including mono- or dialkyl symmetrical or asymmetrical ethylene diamines, alkoxylated propane diamines, polyamine analogs of the above, and mixtures and combinations thereof are examples of those polyamines useful in the above process. Suitable commercial alkoxylated polyamines are, for example, Berolamine 10 and Berolamine 20. Berolamine 20 is a mixture of approx. 55% of ethylenepolyamines (isomers of TETA, TEPA, PEHA, and higher) and approx. 45% of N-ethanol derivatives of polyalkylenepolyamines, and are commercially available from Akzo Nobel Functional Chemicals bv.

One of ordinary skill in the art would recognize that various mono and polycarboxylic acids could be utilized in the described process including, but not limited to formic acid, acrylic acid, amino acid, malic acid (anhydrate), succinic acid, glutaric acid, adipic acid, lactic acid, citric acid and the like, and mixtures thereof. In one embodiment, citric acid is the carboxylic acid of choice.

In the first step of the reaction, 1 equivalent of primary plus secondary amines (N—H bonds) in Berolamine 20 reacts with 0.2 to 2.0 equivalents of carboxylic acid in a tall oil or rapeseed oil fatty acid to form an intermediate. The preferred ratio is 0.3 to 0.9 eq of carboxylic acids, and the most preferred is 0.4 to 0.8 eq. In the second step, 1 eq of N—H bonds in the intermediate react with 0.5 to 2.0 eq of carboxylic acids in citric acid. More preferred is 0.75 to 1.5 eq of carboxylic acids in citric acid.

The reaction temperature of the first step is generally from 150° C. to 175° C., preferably about 165° C. and is generally run for about 2-10 hrs until acid is reduced to less than about <0.2 meq/g. The second step is generally carried out at temperatures of between 50 and 150° C. for 2 to 3 hrs until amine number falls below about 0.5 meq/g) and acid number is less than 1.5 meq/g. A small amount of mineral oil based solvent is used during the second step reaction for lower viscosity and better mixing property. Use of a catalyst is not required in either step of the reaction.

Side products from the reactions above include, but are not limited to the esters between fatty acids and/or the carboxylic acid employed, e.g., citric acid and alkoxylated polyamines (polyamides), and the imidazolines, etc.

The emulsifier of the invention is typically formulated with base oils (diesel or mineral or polyolefin) and polyol or polyol ether(s) based additives to control the activity and flowability, especially at low temperature. These additives include, but are not limited to ethylene glycol, propylene glycol, diethylene glycol, dipropylene glycol, ethylene glycol butyl ether, diethylene glycol butyl ether, triethylene glycol butyl ether, etc.

The emulsifier of the invention is a superior additive for oil or synthetic based drilling fluids, affording enhanced emulsification, and improved electrical stability and fluid loss control, with significantly less volume of additive than previously known with prior art drilling fluid additives. The emulsifier of the invention effects satisfactory emulsification at addition rates typically about one-third the quantity commonly needed for emulsification of oil or synthetic based fluids with prior art emulsifiers. Typically, three pounds to about five pounds of the emulsifier of the invention per barrel of drilling fluid can be effective for emulsification. Even lower quantities can improve the electrical stability and filtration control of drilling fluids, even if already emulsified with other emulsifiers.

Typically, anywhere between about 0.2 to 4 wt % of polyamide compound(s) of the invention is employed in drilling fluid compositions, in another embodiment, between about 0.3 to 3 wt % is employed. Typical oil based drilling fluids containing the emulsifier of the invention are based on oils (diesel or mineral or polyolefin), and may also contain components such as organoclay, brine, weighting agents, limes, dispersants, stabilizers, and barite. Additional components are well within the knowledge of one of ordinary skill in the art.

The emulsifier of the invention is highly active and is believed to be useful with all or substantially all synthetic and oil-based systems known to be effective for drilling fluids. The emulsifier of the invention may also impart a higher viscosity to the drilling fluid and thus is preferably added to the base drilling fluid before any weighting agents are added.

The present emulsifier operates efficiently at high temperatures and pressures, and is stable even at temperatures up to about 500° F. without filtration additives and up to about 500° F. with filtration additives. Adding wetting agents along with the product of the invention in an emulsifier package may improve the oil-wetting nature of the drilling fluid in some base oils but will not be needed in others. Wetting agents may also improve the rheological stability at temperatures up to about 300° F. and further enhance performance of some fluid systems.

The drilling fluid composition of the invention generally contains at least one oil or synthetic based drilling oil. Such drilling oils are known as oil muds and are readily known to those skilled in the art. The drilling fluid composition of the invention also preferably includes brine. In most cases, sodium, calcium and/or magnesium brine is employed.

A method of the invention comprises adding the present polyamide emulsifier to an oil or synthetic based drilling fluid or employing a drilling fluid comprising the polyamide emulsifier of the invention in drilling a borehole in a subterranean formation. In another embodiment, a method of the invention comprises adding the polyamide emulsifier of the invention to an oil or synthetic based drilling fluid to facilitate emulsification of the drilling fluid or the formation of invert emulsions. The invention also relates to a method of enhancing the rate of penetration while drilling a well which comprises circulating a drilling fluid composition according to the invention throughout a borehole while simultaneously rotating a string of drill pipe containing a rotary drill bit on its lower end in contact with the bottom of the borehole, thereby facilitating the removal of drill cuttings formed by said drill bit from the borehole, lubricating the drill bit, removing the heat, and stabilizing the wellbore hole.

The oil or synthetic based drilling fluids of the invention may also include one or more of a variety of optional ingredients known to one of ordinary skill in the art. Such optional ingredients include, but are not limited to organoclays, fluid loss control agents, rheology modifiers, wetting agents, limes, brine, dispersants, stabilizers, barite, and the like.

The rheology (plastic viscosity, yield point, and gel strength) as well as fluid loss property are the two most important attributes of a drilling fluids. Proper plastic viscosity indicates that the drilling fluid is capable of drilling rapidly because of the proper viscosity of drilling fluid exiting at the drilling bit. Yield point is used to evaluate the ability of a drilling fluid to lift drilling cuttings out of the annulus. The present emulsifier delivers better drilling fluid emulsion stability, thus delivers better controllable rheology of the drilling fluid under high temperature and high pressure condition. Fluid loss is the leakage of the liquid phase of drilling fluid to the formation matrix while drilling. The resulting buildup of solid material or filter cake may be undesirable, as may the penetration of filtrate through the formation. Fluid loss can be significantly reduced by improving the drilling fluid emulsion stability with the present emulsifier under high temperature and high pressure conditions, and the compounds of the present invention can thus be used to reduce loss of drilling fluid. Besides, the electric stability and tolerance to the contamination are also very important property of a drilling fluid, and both properties have a close relationship with drilling fluid emulsion stability.

Figure 1:
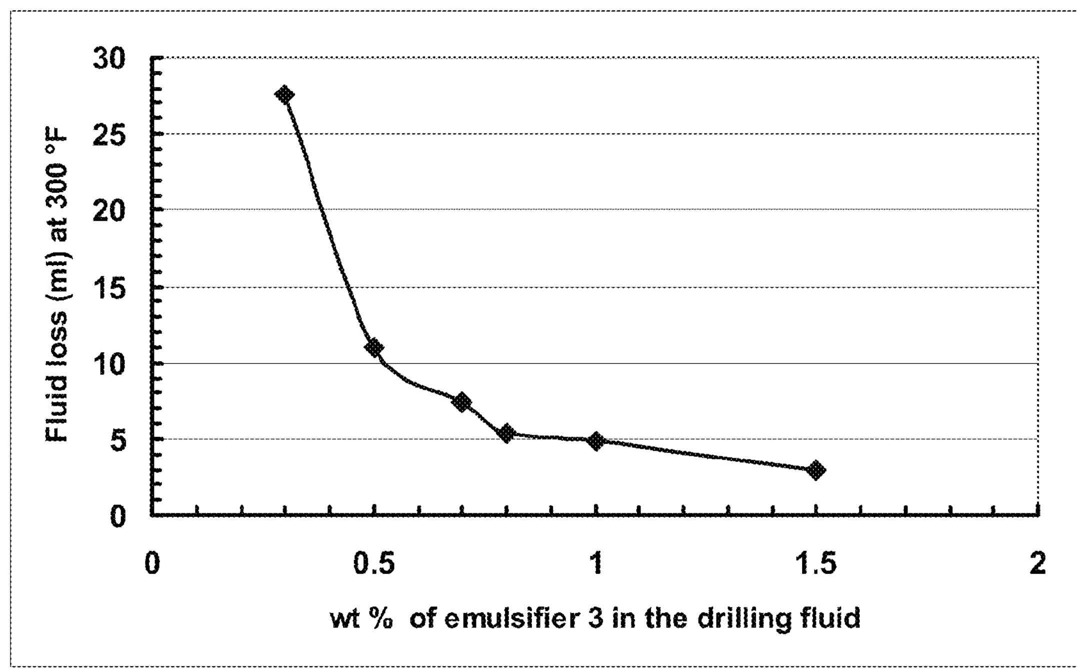
FIG. 1 depicts an example, Example 5, wherin the HTHP fluid loss of diesel based drilling fluids (80/20 oil to water ratio) with the Emulsifier 3 after aging at 300° F. /100 psi for 16 hrs with no fluid loss control additive.

The drilling fluid performance properties invention will now be exemplified by the following non-limiting examples.

EXAMPLE 1

Emulsifier Preparation

In a 2-L 5-necked flask plus Dean-Stark trap under $N_2$, 1084.2 g of Century D-1 (available from Arizona Chemicals) and 248.8 g of Berolamine 20 (Akzo Nobel Chemicals) were placed. This mixture was heated to 165° C. for 8 hr with $N_2$ sparge. A total of 55.8 g of water distilled, and a sample showed 0.126 meq/g of residual acid (target≤0.15 or 5%) and 1.874 meq/g of free amine. After adding 400.8 g of ODC oil (Sasol North America) to the intermediate (for 80% solids), the mixture was heated to ~126° C. and added 356.5 g of citric acid. The reaction maintained at 130° C. for 2.3 hr as 29.7 g of water was collected. The reaction product was further heated at 140° C. for another 5 hr with $N_2$ sparge, during which time another 24.2 g of water was produced. The final product was measured to have acid value of 0.589 meq/g, and amine value of 0.453 meq/g.

EXAMPLE 2

TABLE 1

| Preparation and Analytical Results of Emulsifier 1 to 5 with Berolamine BA-20 | | | | | |
|---|---|---|---|---|---|
| | Emulsifier 1 | Emulsifier 2 | Emulsifier 3 | Emulsifier 4 | Emulsifier 5 |
| Type of Fatty Acid | Tall Oil Fatty Acid[1] | Tall Oil Fatty Acid[1] | Century D1[2] (Tall Oil Fatty Acid) | Nouracid RE09[3] (High Erucic Rape Seed Acid) | Nouracid RE07[3] (Pure Erucic Acid) |
| Type of Carboxylic Acid | Citric Acid | Acrylic Acid | Citric Acid | Citric Acid | Citric Acid |
| Amine content of the final product (meq/g) | 0.386 | 1.28 | 0.453 | 0.622 | 0.306 |
| Acid content of the final product (meq/g) | 0.387 | 0.67 | 0.589 | 1.21 | 0.301 |

[1]commercial low rosin TOFA;
[2]available from Arizona Chemicals, USA;
[3]available from Oleon GmbH, Germany.

EXAMPLE 3

Preparation of the Drilling Fluids of the Invention

The diesel based drilling fluids used in the following non-limiting examples were prepared by mixing with 20 to 30 wt % of base oils (#2 Diesel oil, or mineral oil, or synthetic alpha or internal olefin), 0.3 to 3 wt % of the emulsifier, 0.3 to 1 wt % of organoclay, 5 to 15 wt % of $CaCl_2$ solution (25 wt % active), and 50 to 70 wt % Barite (200 microns of top size) at 7000 to 12000 rpm for 30 to 90 min in a typical laboratory drilling fluid mixer. No fluid loss or any other additives was used for the drilling fluid preparation.

EXAMPLE 4

Measuring Drilling Fluid Performance Properties

Drilling fluid rheology measurements were conducted using a Fann 35A Viscometer with a R1-B1 concentric cylinder geometry at 120° F. After measuring the viscosity @600 rpm (DR1), then @300 (DR2), 200, 100, 6, and 3 rpm, the Plastic Viscosity and Yield Point were calculated according to the following formulas:

$$\text{Plastic Viscosity (PV)}=DR1-DR2$$

$$\text{Yield Point (YP)}=2DR2-DR1.$$

Drilling fluid gel strength was measured for the viscosity @3 rpm after a drilling fluid has set quiescently for a period of time (10 seconds and 10 minutes) with unit of cP.

Drilling fluid Fluid Loss property was measured according to the American Petroleum Institute (API) Recommended Practice 13B (RP 13B), $12^{th}$ Ed (Sep. 1, 1988), on Section 3.4 of High-Temperature/High-Pressure Filtration Test, p 11-13.

Drilling fluid emulsion stability measurement was conducted using OFI Testing Equipment (Houston, Tex.) Emulsion Stability Meter using a standard procedure.

Figure 2:
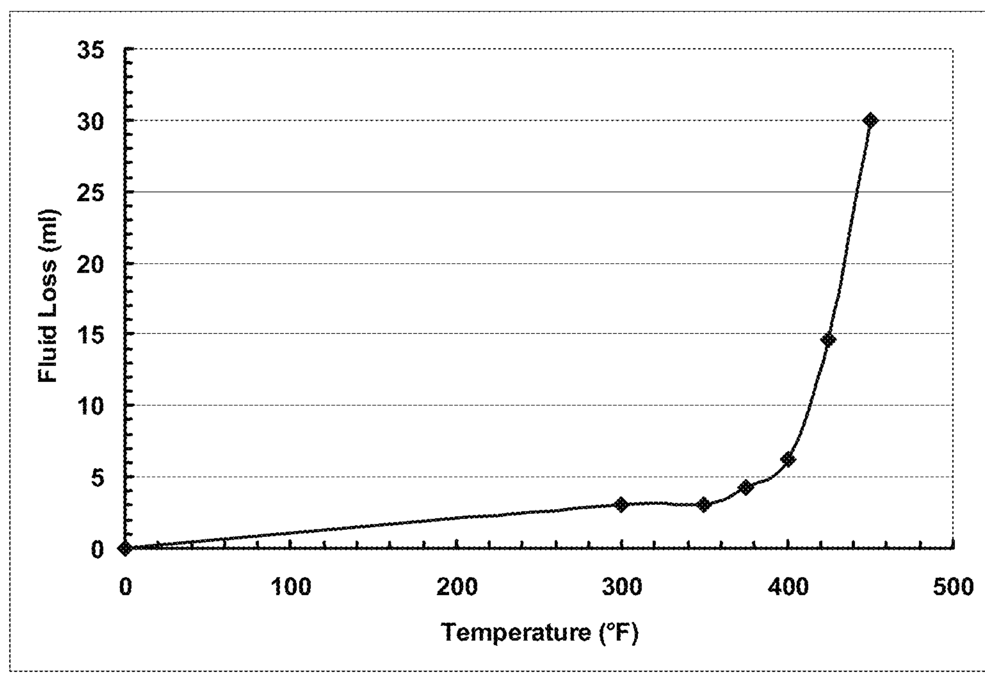
FIG. 2 depicts an example, Example 8, wherein the HTHP fluid loss of diesel based drilling fluids (80/20 oil to water ratio) with the Emulsifier 4 after aging at 300° F. /100 psi for 16 hrs with no fluid loss control additive.

The results of performance property tests are show in Examples 5-11, FIGS. 1-2 and Tables 2-6.

EXAMPLE 6

TABLE 2

| HTHP Performance of diesel based drilling fluids (80/20 oil to water ratio) with the emulsifier before aging at 300° F./100 psi for 16 hrs | | | | |
|---|---|---|---|---|
| | Before Aging | | | |
| | Emulsifier 1 (1.5 wt %) | Emulsifier 2 (2.6 wt %) | Emulsifier 3 (1.5 wt %) | Emulsifier 4 (2 wt %) |
| Plastic Viscosity (cP) | 28 | 33 | 31 | 30 |
| Yield Point (lb/100 sq. ft) | 26.5 | 32.5 | 28.5 | 20 |
| Electric Stability (v) | 840 | 780 | 1045 | 920 |
| Gel Strength (10 s/10 min) | 12/13 | 15/16 | 14/15 | 9/9 |

EXAMPLE 7

TABLE 3

| HTHP Performance of diesel based drilling fluids (80/20 oil to water ratio) with the emulsifier after aging at 300° F./100 psi for 16 hrs | | | | |
|---|---|---|---|---|
| | After Aging | | | |
| | Emulsifier 1 (1.5 wt %) | Emulsifier 2 (2.6 wt %) | Emulsifier 3 (1.5 wt %) | Emulsifier 4 (2 wt %) |
| Plastic Viscosity (cP) | 30.5 | 56 | 30 | 31 |
| Yield Point (lb/100 sq. ft) | 5 | 50 | 19.5 | 29 |
| Electric Stability (v) | 538 | 660 | 818 | 1125 |
| Gel Strength (10 s/10 min) | 4.5/5 | 21/23 | 10/10.5 | 13/14 |
| Fluid Loss (ml) | 8.4 (no water) | 12 (1 ml of water) | 3 (no water) | 3 (no water) |

EXAMPLE 9

TABLE 4

HTHP Performance of diesel based drilling fluids (#2111-56) with 2.5 wt. % of the Emulsifier 5 before and after aging at 350° F./160 psi for 16 hrs

| | Before Aging | After Aging |
|---|---|---|
| Plastic Viscosity (cP) | 31 | 37 |
| Yield Point (lb/100 sq. ft) | 14 | 12 |
| Electric Stability (v) | 985 | 530 |
| Gel Strength (10 s/10 min) | 8/8.5 | 5.5/6 |
| Fluid Loss (ml) | | 9.4 (no water) |

EXAMPLE 10

TABLE 5

HTHP Performance of mineral and synthetic oil based drilling fluids (80/20 oil to water ratio) with the Emulsifier 1 Before and after aging at 300° F./100 psi for 16 hrs

| | Base mineral oil: ODC oil[4], with 1.2 wt % of Emulsifier 1 | | Base synthetic oil: Isomerized alpha olefin 16-18[5], with 1.5 wt % of Emulsifier 1 | |
|---|---|---|---|---|
| | Before aging | After aging | Before aging | After aging |
| Plastic Viscosity (cP) | 34 | 32.5 | 31 | 32.5 |
| Yield Point (lb/100 sq. ft) | 7 | 9 | 14 | 17 |
| Electric Stability (v) | 827 | 587 | 1007 | 707 |
| Gel Strength (10 s/10 min) | 4/4 | 4/4 | 7/8 | 8/9 |
| Fluid Loss (ml) | | 5 (no water) | | 6.4 (no water) |

[4]available from Sasol North America;
[5]available from CP Chem, USA

EXAMPLE 11

TABLE 6

Pour point of 65% of Emusifier 3 in 11.6% of mineral oil (LVT-200[7]) and 7.4% of additive

| Additive | Pour Point (° F.) (ASTM D 97-57) |
|---|---|
| Butyl Cellosolve[6] | 35 |
| Butyl Carbitol[6] | 40 |
| Butoxytriglycol[6] | 40 |
| Control (7.4% of LVT200[7]) | 60 |

[6]available from Dow Chemicals, USA;
[7]Available from ConocoPhillips, USA

The invention claimed is:

1. A compound of formula (A)

$$Y\{O(CH_2)_e\}_a\{NX(CH_2)_e\}_b\{N[C(O)R^2](CH_2)_e\}_c\{NH(CH_2)_e\}_dNHZ \quad (A)$$

wherein a is an integer of from 0-5, b and c are each independently selected from integers of from 0 to 10, with the proviso that b and c cannot both be 0 at the same time, d is an integer of from 0 to 10, e is an integer of from 1-5, Y is selected from H, X, —C(O)$R^1$ or —C(O)$R^2$ and Z is selected from —C(O)$R^1$ or X, wherein $R^1$ and $R^2$ are linear or branched, saturated or unsaturated hydrocarbyl groups having from 7 to 30 carbon atoms, and X is a carbonyl group derived from an acid comprising a $C_2$-$C_{10}$ hydrocarbon chain, said acid being selected from the group consisting of $C_2$-$C_{10}$ monocarboxylic acids, $C_2$-$C_{10}$ dicarboxylic acids, tricarboxylic acids containing $C_2$-$C_{10}$ hydrocarbyl groups, and mixtures thereof.

2. The compound according to claim 1 wherein X is a carbonyl group derived from a carboxylic acid chosen from the group consisting of formic acid, acrylic acid, amino acid, malic acid (anhydrate), succinic acid, glutaric acid, adipic acid, lactic acid, citric acid and mixtures thereof.

3. The compound of claim 1 wherein said compound is an alkoxylated polyamide of the formula:

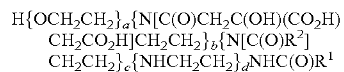

$$H\{OCH_2CH_2\}_a\{N[C(O)CH_2C(OH)(CO_2H)CH_2CO_2H]CH_2CH_2\}_b\{N[C(O)R^2]CH_2CH_2\}_c\{NHCH_2CH_2\}_dNHC(O)R^1$$

where $R^1$ and $R^2$ are each independently selected from linear or branched, saturated or unsaturated $C_{10}$-$C_{24}$ hydrocarbyl groups.

4. The compound of claim 1, having the formula:

$$H\{OCH_2CH_2\}\{N[C(O)CH_2C(OH)(CO_2H)CH_2CO_2H]CH_2CH_2\}_b\{NC(O)R^2CH_2CH_2\}_c\text{—}\{NHCH_2CH_2\}_dNHC(O)R^1$$

wherein $R^1$=$R^2$ and being selected from the group consisting of $C_{17}$ hydrocarbyl group derived from tall oil, $C_{21}$ hydrocarbyl group derived from erucic acid, $C_{17}$ hydrocarbyl group derived from oleic acid, $C_{17}$ hydrocarbyl group derived from soybean oil;

b is 0-4; c is 0 to 4, with the proviso that b and c cannot both be 0 at the same time;

and d is 0 or 2.

5. The compound of any of the claim 1, having the formula:

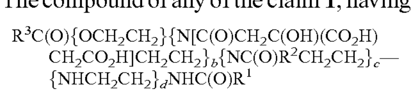

$$R^3C(O)\{OCH_2CH_2\}\{N[C(O)CH_2C(OH)(CO_2H)CH_2CO_2H]CH_2CH_2\}_b\{NC(O)R^2CH_2CH_2\}_c\text{—}\{NHCH_2CH_2\}_dNHC(O)R^1$$

wherein $R^1$=$R^2$=$R^3$ and being selected from the group consisting of $C_{17}$ hydrocarbyl group derived from tall oil and $C_{21}$ hydrocarbyl group derived from erucic acid;

b is 0-4; c is 0 to 4, with the proviso that b and c cannot both be 0 at the same time;

and d is 0 or 2.

6. A drilling fluid composition which comprises at least one oil and at least one polyamide compound according to claim 1.

7. The composition of claim 6 wherein said composition comprises from 0.5 to 4 wt % of said at least one polyamide, based on the total weight of the composition.

8. A process of preparing the polyamide compound of claim 1, said process comprising reacting a fatty acid and an polyamine to form an amidoamine intermediate product followed by further reacting said amidoamine intermediate with a $C_2$-$C_{10}$ monacarboxylic acid, $C_2$-$C_{10}$ dicarboxylic acid, or tricarboxylic acid containing $C_2$to $C_{10}$ hydrocarbyl groups, or a mixture of such acids in order to obtain said polyamide compound.

9. The process of claim 8 wherein the mole ratio of said fatty acid to said amine is from about 0.1:1 to about 10:1, and the molar ratio of said amidoamine intermediate and said monocarboxylic acid, dicarboxylic acid, or tricarboxylic acid containing $C_2$ to $C_{10}$ alkyl/alkylene groups, is from about 0.2:1 to 5:1.

10. The process of claim 8 wherein said fatty acid is of the formula:

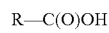

R—C(O)OH wherein R is a saturated or unsaturated, branched or straight chain, substituted or unsubstituted hydrocarbyl group having from 7 to 30 carbon atoms, and said alkoxylated polyamine is of the formula:

$$H\{O(CH_2)_e\}_a[NH(CH_2)_e]_fNH_2$$

wherein a is 0 or 1, e is 2 or 3 and f is 1-4.

11. The process of claim 8 wherein said polycarboxylic acid is chosen from the group consisting of formic acid, acrylic acid, amino acid, malic acid, succinic acid, glutaric acid, adipic acid, lactic acid, citric acid and mixtures thereof.

12. The process of claim 8 wherein in a first step the fatty acid is reacted with said alkoxylated polyamine at an equivalent ratio of from about 0.2:1 to about 2:1, at a temperature of from about 150° C. to 175° C. until the acid is reduced to less than about $<0.2$ meq/g, in order to obtain said polyamine intermediate and in a second step the polyamine intermediate is reacted with said carboxylic acid at an equivalent ratio of from about 0.1:1 to 1:1 at a temperature of from about 50 to 150° C. until amine number falls below about 0.5 meq/g) and acid number is less than about 1.5 meq/g.

13. A method of emulsifying an oil based drilling fluid composition which comprises adding to said composition from 0.5 to 4 wt % of said at least one compound according to claim 1.

* * * * *